United States Patent [19]

Takahashi et al.

[11] Patent Number: 4,594,700
[45] Date of Patent: Jun. 10, 1986

[54] AUTOMATIC DISC PLAYER SYSTEM WITH DISC SELECTING AND LOADING MEANS

[75] Inventors: Hideyuki Takahashi; Isami Kenmotsu; Takahiro Okajima; Yoshio Takahashi, all of Tokorozawa, Japan

[73] Assignee: Pioneer Electronic Corporation, Tokyo, Japan

[21] Appl. No.: 670,128

[22] Filed: Nov. 9, 1984

Related U.S. Application Data

[63] Continuation of Ser. No. 373,163, Apr. 29, 1982, abandoned.

[30] Foreign Application Priority Data

May 2, 1981 [JP]  Japan ................................ 56-067396

[51] Int. Cl.⁴ ......................... G11B 17/00; G11B 5/48
[52] U.S. Cl. ....................................... 369/39; 369/79; 369/36
[58] Field of Search .................... 369/39, 38, 37, 79, 369/36, 257

[56] References Cited

U.S. PATENT DOCUMENTS

| | | | |
|---|---|---|---|
| 1,868,846 | 7/1932 | Oyston | 369/38 |
| 3,131,936 | 5/1964 | Hagen | 369/39 |
| 3,246,899 | 4/1966 | Bodenroder | 369/39 |
| 3,378,264 | 4/1968 | Foufounis | 369/39 |
| 3,662,344 | 5/1972 | Menke | 369/39 |
| 3,940,148 | 2/1976 | Torrington et al. | 369/79 |
| 4,092,671 | 5/1978 | Camerik | 369/79 |
| 4,170,030 | 10/1979 | Castrodale et al. | 369/38 |
| 4,218,065 | 8/1980 | van der Hoak et al. | 369/271 |
| 4,273,342 | 6/1981 | Gilson et al. | 369/39 |

Primary Examiner—Steven L. Stephan
Attorney, Agent, or Firm—Fleit, Jacobson, Cohn & Price

[57] ABSTRACT

An automatic disc player system with means for automatically selecting the disc and loading the disc on a turntable. A carrier assembly including a pickup means is slidable along a longitudinal axis of a disc holder portion in which the discs are arranged face to face on a longitudinal holder member. In order to load the disc on the turntable, a slider having a roller to guide the disc forces the same to a position of play where a clamper having a portion cooperative with the turntable catches the disc to load the same on the turntable. The operation of selecting and loading the disc is controlled by a microcomputer assisted control system.

7 Claims, 35 Drawing Figures

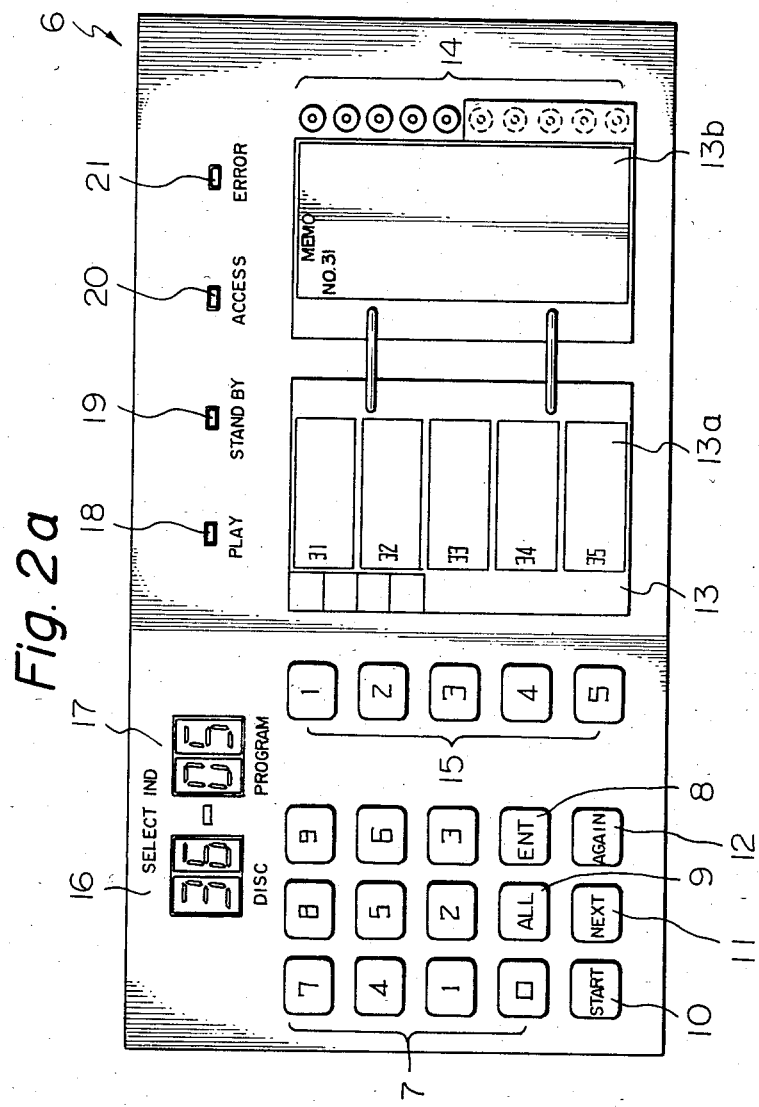

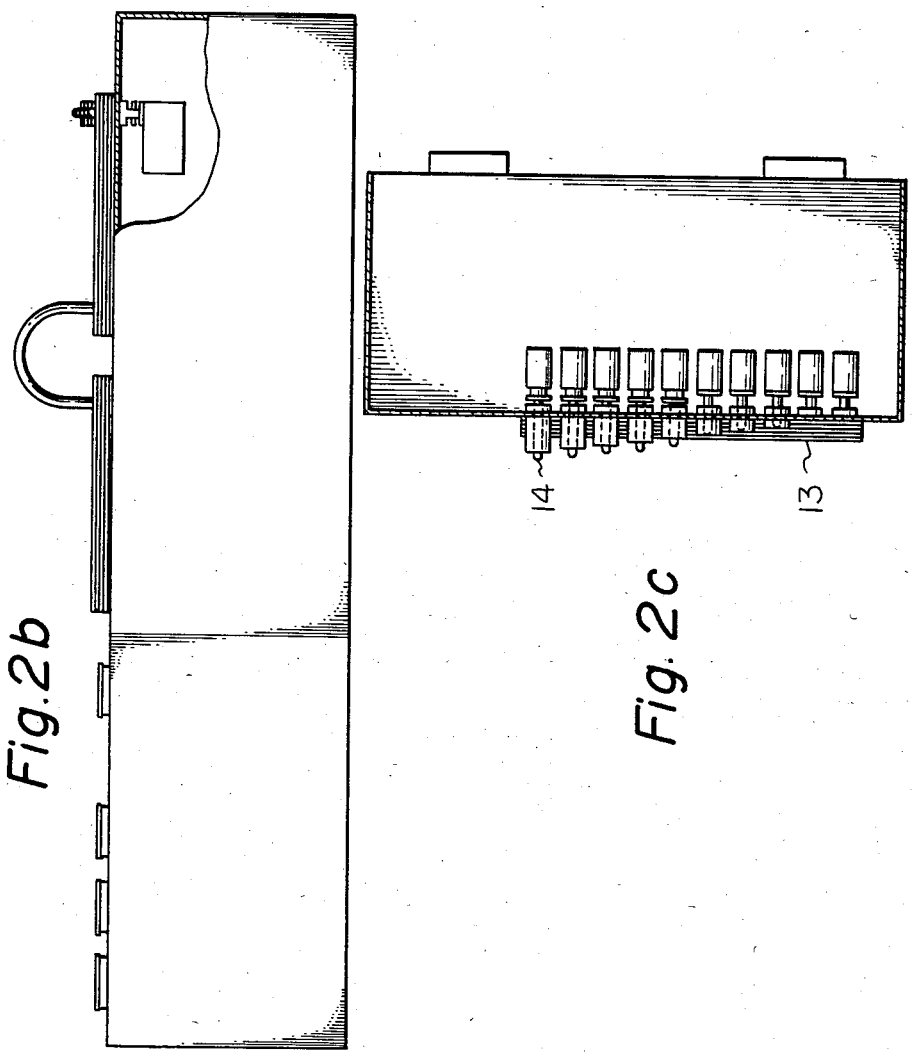

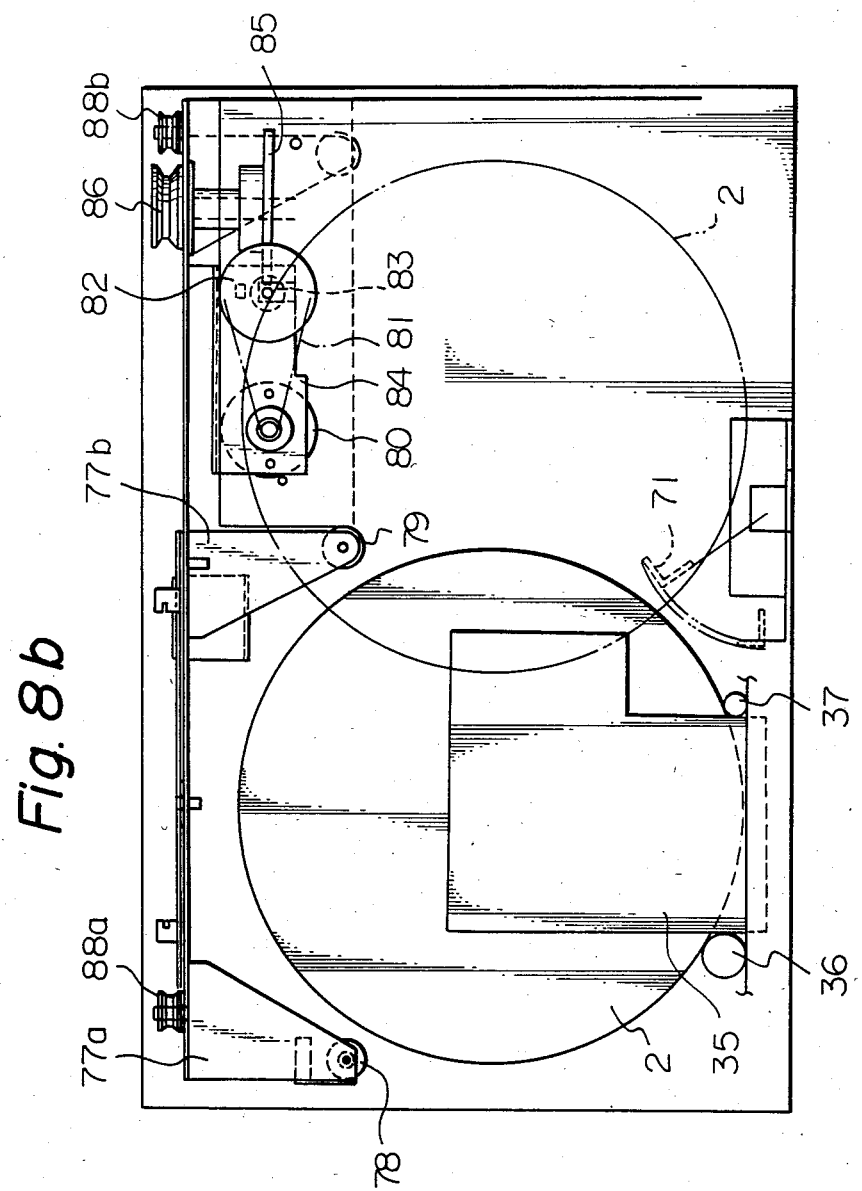

AUTOMATIC DISC PLAYER SYSTEM WITH DISC SELECTING AND LOADING MEANS

This application is a continuation of application Ser. No. 373,163, filed Apr. 29, 1982, now abandoned.

BACKGROUND OF THE INVENTION

1. Field of the Invention

The present invention relates to an automatic disc player system, and more particularly, to an automatic disc player system in which a plurality of discs are stored therein and one of the discs is in turn selected and loaded automatically, thus enabling a successive play of discs in accordance with a preselected order of play.

2. Description of the Prior Art

In the automatic disc player systems of the type described above, the juke box is generally known and used popularly.

However, in the case of known type juke box, there are several disadvantages such that the size of the body of the system is considerably large, and that it is very troublesome to put the discs in the portion of the system for receiving the discs and take them out of that portion due to structural reasons.

Therefore, those juke boxes are not suited for family use and are only available for business use.

On the other hand, with the advancement of digital circuit technology, several types of systems are proposed in which the density of information contained on the disc is greatly raised, by utilizing the digital recording process, as compared with the conventional LP record in which the signals are recorded in the analog form.

In particular, there is a type utilizing a disc of relatively small size, generally called "compact disc" or "C-DAD", to which a laser beam is applied from a pickup means for reproducing signals prerecorded thereon.

The compact disc has a diameter of 12 cm (about 4.7 inches), which is easy to handle, and therefore has an advantage in that the size of the player system can be reduced.

Since the compact disc can record, on a single side thereof, information as much as one and a half times that recorded on both sides of the conventional LP records, only about 50 compact discs are required for recording 1000 pieces of music with each having 3 minutes of playing time. In such a case, the total thickness of the stacked compact discs is only 6 cm, since the thickness of each compact disc is about 1.2 mm.

It will be seen from the foregoing, if this small compact disc is adapted for a juke box, the size of the system can be reduced and such system can be available for family use.

An object of the present invention is therefore to provide a disc player system having relatively small size and in which the handling of discs (putting them in the housing of the system and taking them out of it) is facilitated.

It is another object of the invention to provide a disc player system in which the number of discs held within the housing of the system is increased by employing the compact disc.

BRIEF SUMMARY OF THE INVENTION

According to the invention, a disc player system comprises a housing, a holder means disposed within the housing and adapted to receive and hold a plurality of discs in a manner that the discs are juxtaposed in a direction perpendicular to the face of the discs, a player means movably disposed along an axis parallel to that direction, and a disc transportation means for transporting the selected one of the discs between the holder means and the player means, wherein the holder means is disposed at a position adjacent to a disc entrance port formed at a portion of the body, thereby facilitating the setting of discs in the system.

According to an another aspect of the invention, an automatic disc player system is provided in which compact digital audio discs are utilized, thereby eliminating the necessity of provision of a discrete container box for a great number of conventional LP records, and also eliminating the wearing and scratching of discs during playing and handling thereof.

BRIEF DESCRIPTION OF THE DRAWINGS

The above and other advantages of the invention will become understood in the following description and the accompanying drawings in which like numerals refer to like parts and in which:

FIG. 2a is a plan view of an operation part of the system;

FIG. 2b is a partially sectional front view of the operation part;

FIG. 2c is a side sectional view of the operation part;

FIG. 8b is a front view of the disc slider portion;

FIG. 15b is a side view similar to FIG. 15a;

DETAILED DESCRIPTION OF A PREFERRED EMBODIMENT

Figure 1:
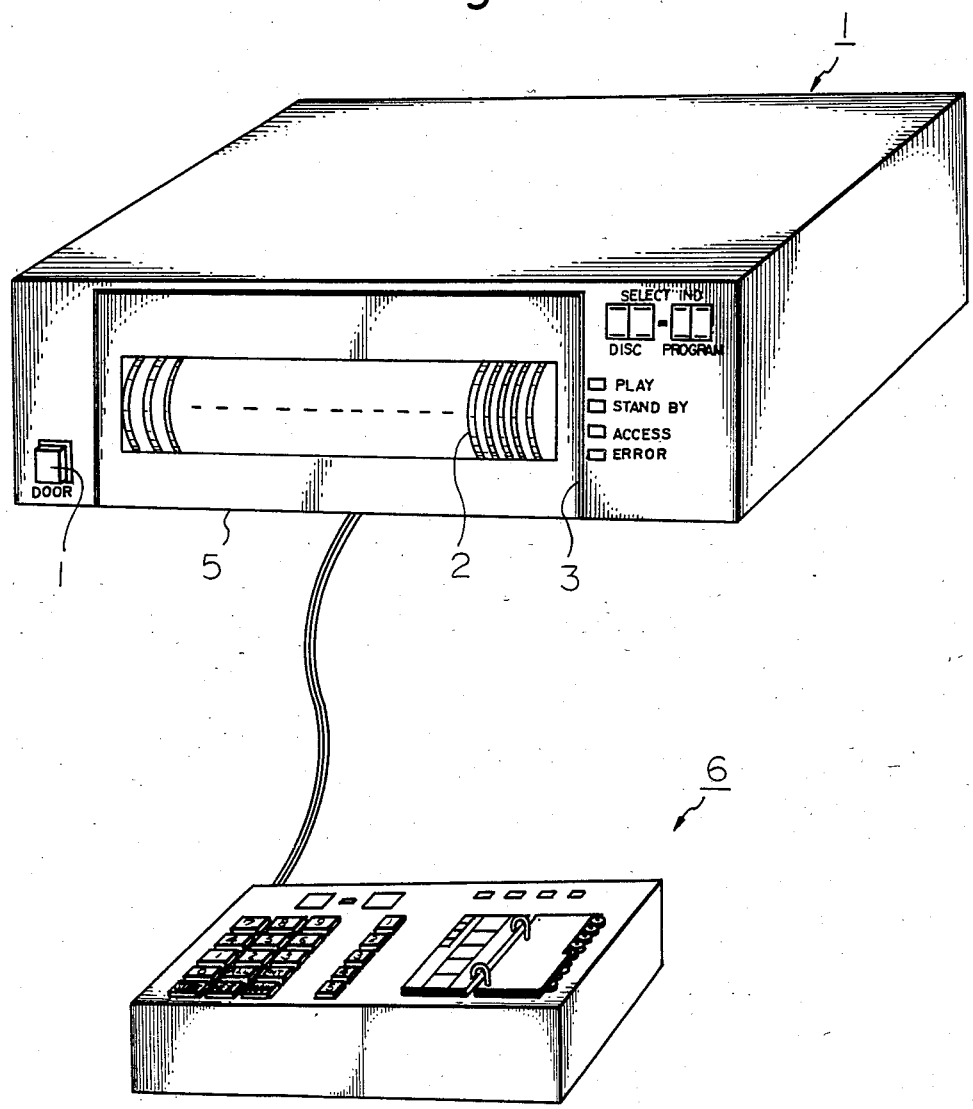
FIG. 1 is a general perspective view of an automatic disc player system according to the present invention.

Reference is first made to FIG. 1 in which an embodiment of the present invention is illustrated.

In FIG. 1, the automatic disc player system comprises a body 4 which houses a plurality of discs 2 and incorporates therein mechanical and electronic portions for automatically playing the discs 2.

The body 4 forms a solid casing having the same size as that of other audio equipments such as amplifiers, tuners, and so on, for allowing it to be stacked with each other.

At the front face, for example, of the body 4, there is formed a disc entrance port 3, and a disc holder portion (described hereinafter) is disposed adjacent to the disc entrance port 3 so as to facilitate the taking in and out the discs. In order to close the disc entrance port 3, a door 5 is provided and hinged at the lower portion of the front face of the body 4. The opening and closing of the door 5 can be operated by a switch 1 disposed on the front face of the body 4.

The reference numeral 6 indicates an operation part which produces various control signals, and preferably formed separately from the body 4.

The control signals may be transmitted to the body via either wired or wireless means.

Turning to FIGS. 2a to 2c, the construction of the operation part is explained.

The operation part 6 includes a set of push buttons or number keys 7, each of them bearing a number from 0 to 9 respectively, for designating the number of the disc and the number of the music on the disc to be played, an ENT key 8 for registering the selected number to a memory means, an ALL key 9 for determining whether the discs are played in turn from No. 1 to the end, or whether the discs are played in turn according to the selected order, a START key for starting play after the registration of the selected number to the memory, a NEXT key for skipping to the next disc or to the next music during playing, and an AGAIN key for repeating the program in accordance with the registered number.

The operation part 6 also includes a set of index plates 13 for entering the name of music and acting as means for memorizing and searching the contents, which is replacable with the change of the disc, a plurality of index switches 14, provided as many as the number of index plates, and cooperative with the index plates 13 for determining which of the index plates is referred, and a set of index keys 15 independent from the above mentioned number keys 7, and each of them bearing the number from 1 to 5 respectively, for designating the number of the disc.

The data entered on the index plate such as the title of the disc or the name of the music can be altered in connection with the change of the disc.

In addition, both the body 4 and the operation part 6 are respectively provided with display devices including DISC indicator 16 and PROGRAM indicator 17 for indicating the number of the disc or the number of music designated or being played, a PLAY indicator 18 for indicating the play operation of the system, a STAND BY indicator 19 for indicating that a carrier (described hereinafter) is returned to a predetermined position and that the system is ready for playing, an ACCESS indicator 20 which is lighted up while the carrier and a pickup (described hereinafter) is moving to a predetermined position, and an error indicator 21 which is lighted up when the disc is not found at the selected position or when it is recognized at the time of play that disc is placed inside out.

It is to be noted that each of keys for various operations and the memorizing means may be formed separately on each of the body 4 and the operation part 6, or only on the body 6, on the front face, for example, although the above described example has a operation part 6 including keys and memorizing means formed integrally.

Figure 3A:
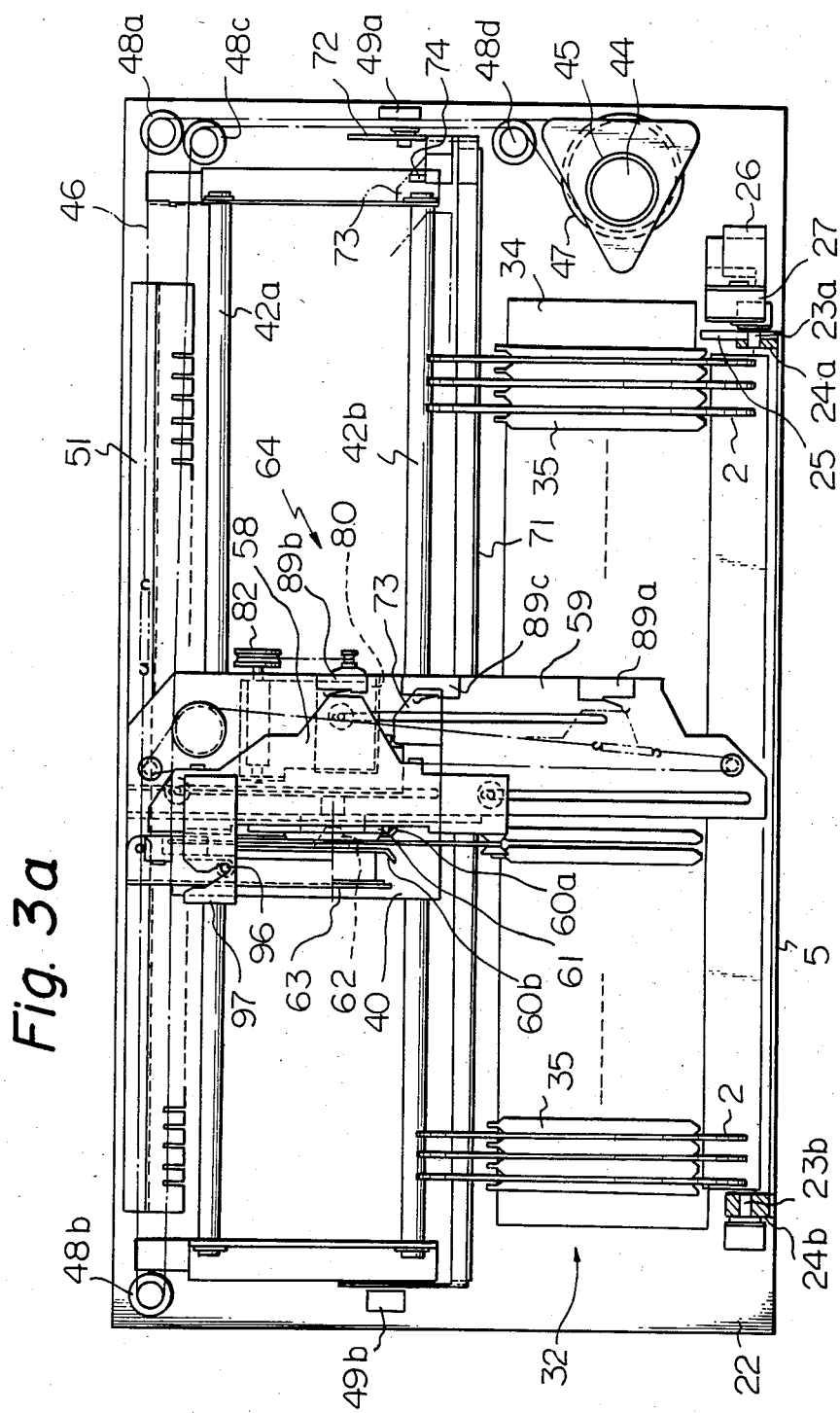
FIG. 3a is a plan view of the body of the system.
Figure 3B:
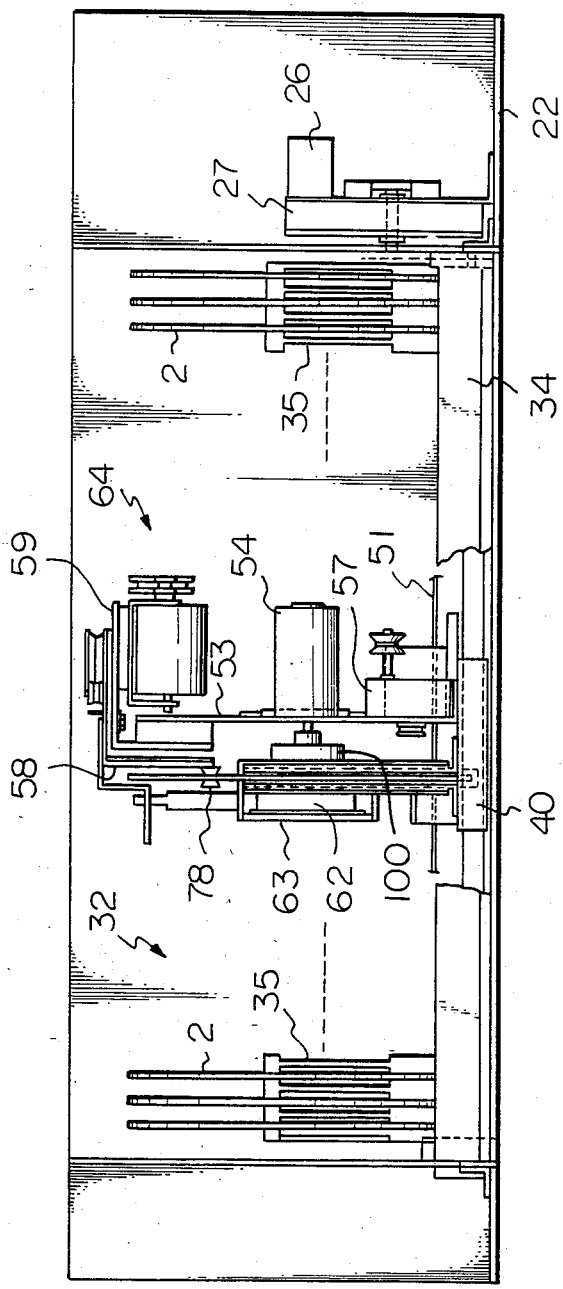
FIG. 3b is a front view of the body of the system.
Figure 3C:
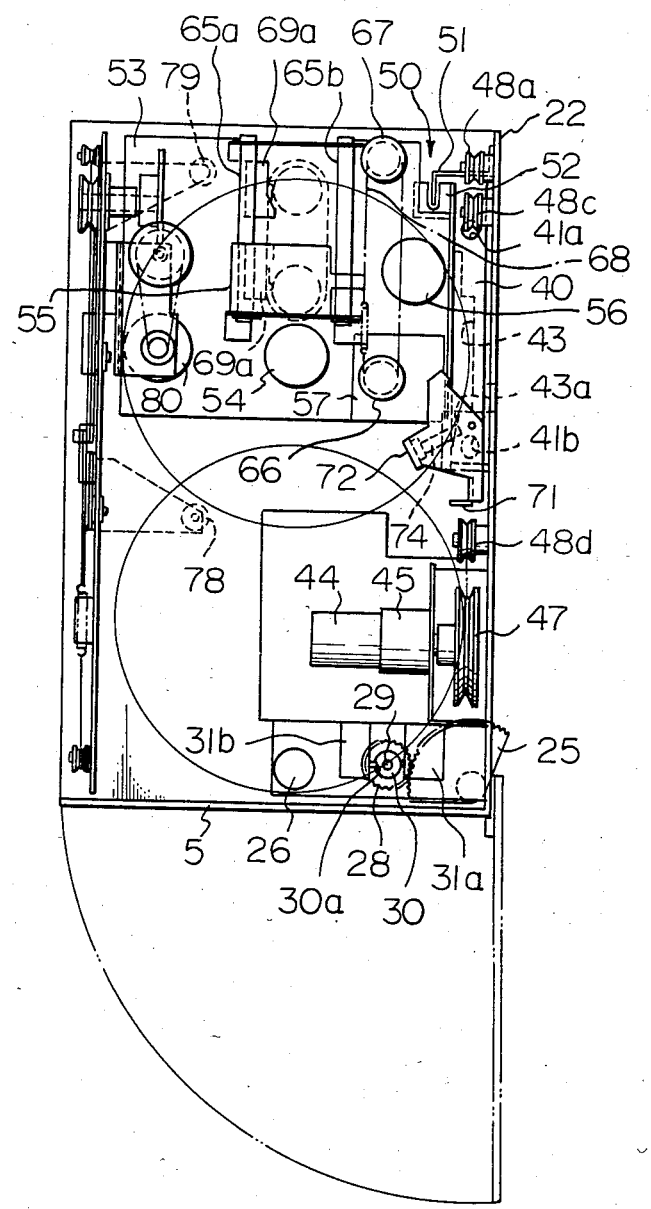
FIG. 3c is a side view of the body of the system.

Reference is now made to FIGS. 3a to 3c, in which the construction of the system is illustrated.

The door 5 is made of a transparent material, such as plastics, and painted at the peripheral portions thereof so as to mask the inner part of the body 4. At both sides of the lower edge thereof, the door 5 is provided with a pair of support pins 23a and 23b fixed to an under base 22, and a pair of bearing members 24a and 24b, respectively, engaged thereto.

One of the bearing members 24a and 24b, such as the bearing member 24a as illustrated, is provided with a sector gear plate 25, which is meshed with a pinion 28 of a reduction gear assembly 27 driven by a motor 26 fixed to the under base 22.

A shaft 29 of the pinion 28 also has a cam plate 30 with a notch 30a. A pair of sensing switches 31a and 31b are disposed at both sides of the cam plate 30 and a sensing member of sensing switches 31a or 31b slidably contacts with the outer periphery of the cam plate 30 so as to sense the closed position and fully opened position of the door 5 when one of the sensing members is received in the notch 30a.

Figure 4:
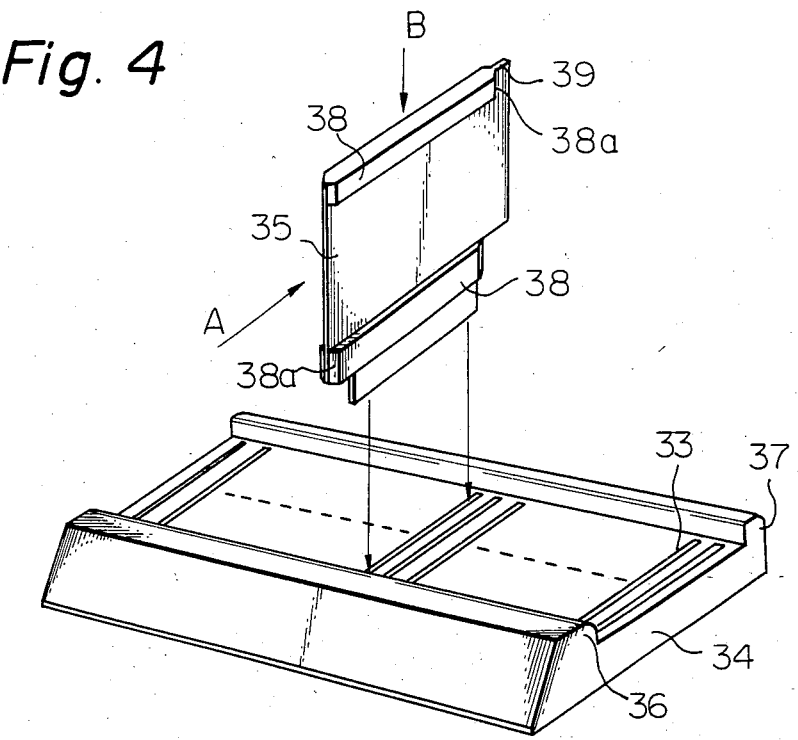
FIG. 4 is a general perspective view of a disc holder portion of the system.
Figure 5A:
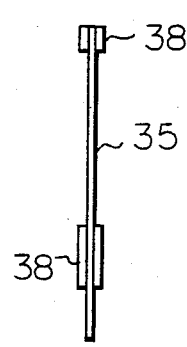
FIG. 5a is a front view of a partition plate of the disc holder portion, viewed in the direction of the arrow in FIG. 4.
Figure 5B:
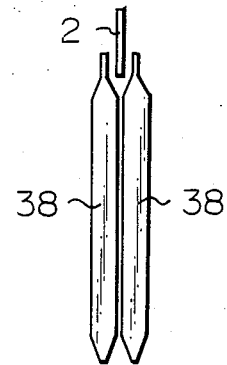
FIG. 5b is a plan view of the partition plates, viewed in the direction of arrow B in FIG. 4.

A disc holder portion 32 includes, as shown in FIG. 4, a support base 34 secured by the under base 22, having a plurality of grooves 33 spaced by a predetermined distance from each other, and a plurality of partition plates 35 inserted into the grooves respectively. The spaces between the partition plates 35 are used for receiving individual discs so that the discs are uprightly stored in the disc holder portion.

The support base 34 is formed by a one-piece member having a pair of support flanges 36 and 37 which are adapted for positioning the discs by supporting them at two points of the lower peripheral portion thereof.

The front one of the support flanges 36 and 37 (the one located adjacent to the door 5) is formed to have a height higher than that of the other one so as to prevent the discs from moving forward and falling down from the disc entrance port, and these support flanges 36 and 37 may be formed separately from the support base 34.

In order to reduce the friction between the discs and the partition plates and to eliminate damage to the discs, the partition plate 35 is provided with a pair of guide walls 38 and formed into a generally I shaped member. The faces of the partition plate 35 are coated by a coating material such as Teflon, at least on the portions which contact the discs. The front and rear ends of the guide walls 38 are shaped into a tapered or curved configuration so as to safely guide the discs into the holding position from the front (outer) side when discs are put in the system or from the rear (inner) side when the play of the disc is finished. The inner ends 38a of the the guide walls are further provided with an introduction part 39, thereby ensuring the reception of the disc after finishing the play of disc, which is effected in such a manner that the disc 2 is partially taken out from the holding position and the peripheral portion of the disc is positioned within the space between the introduction parts 39.

In FIG. 3, the carrier 40 is movably supported by a pair of guide bars 42a and 42b via a round hole 41a and an elongated hole 41b perforated on both sides thereof.

The carrier assembly is further provided with a guide support 43 which has a recess adapted for receiving the disc 2 when the latter is taken out from the disc holder portion 32 on the upper face thereof.

In this state, the disc 2 is supported by the guide support 43 at two points at the lower portion thereof for example, so that the center of the disc 2 is positioned at slightly lower than the central position of a clamper which is described hereinafter.

At a portion of the guide support 43 located on the side of the disc holder portion 32 there is provided a slope 43a so that the disc moves smoothly.

Preferably, the other portion of the guide support 43 is provided with another slope which prevents the disc 2 from being rearwardly displaced from the normal position of play and automatically return it to the proper position if the latter is displaced from the proper position.

The carrier 40 is laterally moved by a drive motor 44 via a reduction mechanism 45 and a wire 46.

The wire 46 is driven by a pulley 47 of the reduction mechanism 45 and guided by four pulleys 48a to 48d on the under base, and fixed to the carrier 40.

A pair of sensing switches 49a and 49b are provided for sensing each of right and left side limit of the lateral movement of the carrier 40, and in this case, if a home position of the carrier, in which the carrier is at rest, is selected at the right side limit of the carrier movement, the sensing switch 49a can be also used for sensing that the carrier is in the home position.

In addition to these sensing switches 49a and 49b, there is provided a carrier position sensor 50 which comprises a slit plate 51 of an elongated configuration along the direction of the movement of the carrier 40 and corresponding to the disc holder portion, and a photo coupler 52 fixed on the carrier 40 and arranged so that slits of the slit plate 51 pass through a gap formed in the photo coupler 52.

A mechanism base 53 is fixedly mounted on the carrier 40.

A disc drive motor 54 for driving the disc, a pickup for reading the information of the disc slidably mounted on the mechanism base 53, a pickup drive motor 56 for driving the pickup 55 and reduction mechanism therefor, a slider 58 for taking a disc out of the disc holder portion 32, and a guide base 59 for guiding and supporting the latter are mounted on the mechanism base 53.

In addition to the portions described above, a pair of guide plates 60a and 60b for guiding the disc which is taken out from the disc holder portion 32 to the play position, a sensor 61 mounted on either one of the guide plates 60a and 60b for sensing the side of the disc and whether or not the disc is present, and a clamp arm 63 having a clamper 62 for holding the disc, are mounted on the mechanism base 53 and all of these portions form a carrier assembly used as means for playing discs.

The pickup 55 is secured by a pair of guide bars 65a and 65b so as to allow the movement thereof along a diagonal axis of the disc, and driven by the pickup drive motor 56 via a pulley 66 of the reduction mechanism 57, and belt 68 guided by a pulley 67 disposed on the mechanism base 53.

In order to sense the position of the pickup, especially at the inner and outer limits of the record track of the disc, a pair of sensing switches 69a and 69b are provided.

Figure 15A:
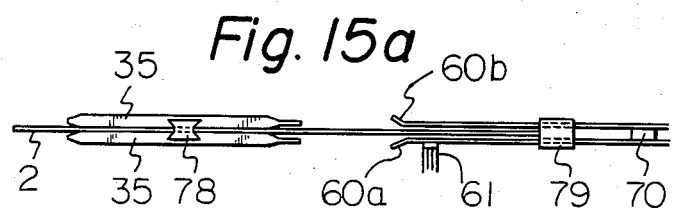
FIG. 15a is a plan view of each portion of the system during the operation of judging the presence of the disc and the side of the disc, especially showing the position of each portion and the interrelationship therebetween.
Figure 15B:
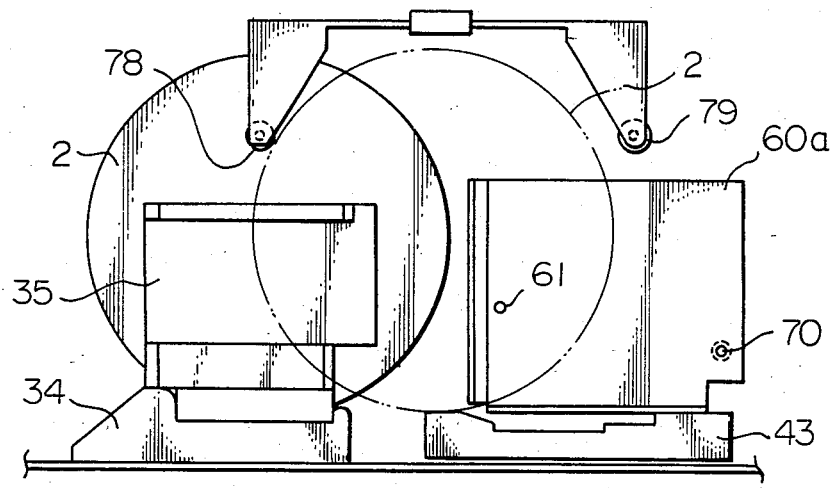

The guide plates 60a and 60b are fixed with each other by a stopper pin 70 (shown in FIG. 15) for preventing the disc from moving rearwardly, so that predetermined width of gap is maintained therebetween, and the portions of guide plates 60a and 60b adjacent to the disc holder portion 32 is curved outwardly.

With these curved portions, the guide plates 60a and 60b positively guide the disc into the play position regardless of a discrepancy between the positions of carrier assembly 64 and the disk holder portion 32, as well as preventing leaning of the disc in the play position.

It is to be noted that the guide plates 60a and 60b may be formed by a pair of thick members each of which has a tapered portion at the front edge thereof.

As shown in FIG. 3, a disc stopper 71 for preventing the disc from moving out of the disc holder portion 32 is disposed behind the disc holder portion 32, and supported by a stopper arm 72 pivotably mounted on the under base 22 and regulated in its position by the latter.

A cam pin 74 which is cooperative with a cam member 73 projected from the carrier 40 is fixed to the stopper arm 72.

Figure 6A:
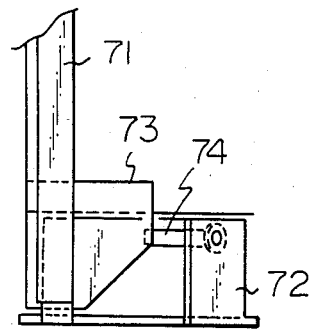
FIGS. 6a and 7a are plan views of a disc stopper, showing the operation thereof.
Figure 7A:
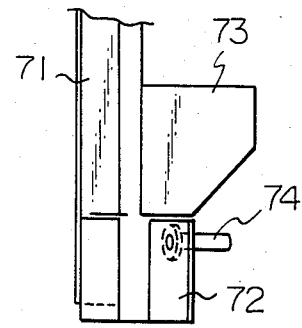
Figure 6B:
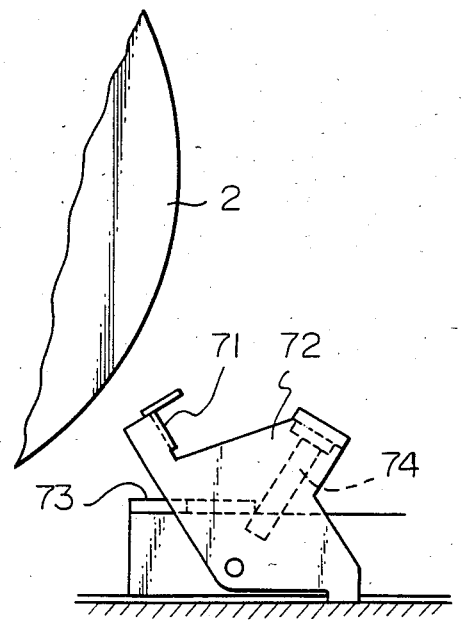
FIGS. 6b and 7b are side views of the disc stopper, similarly showing the operation thereof.
Figure 7B:
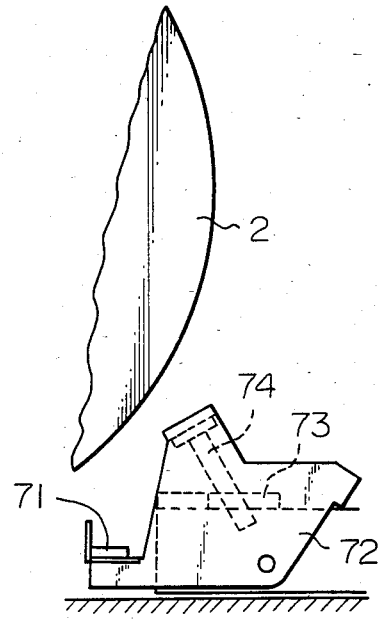

When the carrier assembly 64 is at the right side limit, i.e., the home position, the cam pin 74, by engaging with the cam member 73 of the carrier 40, forces the disc stopper 71 to move to a position for preventing the movement of the discs as shown in FIGS. 6a and 6b.

On the other hand, when the carrier assembly has moved from the home position, the cam pin 74 is disengaged from the cam member 73 of the carrier 40, and allows the disc stopper 71 to rotate in the counter clockwise direction so as to move away from the above mentioned positon of preventing the movement of the discs.

The above mentioned position of the disc stopper 71 is determined so that the disc within the disc holder portion 32 can be automatically returned to an initial position on the support members 36 and 37 when the disc is applied with an external force, and the disc stopper 71 may contact the discs when they are positioned on the disc support members 36 and 37. The disc stopper 71 also acts as a member for guiding and supporting the rear end of the disc when the latter is put in the system, and limiting the movement of the disc when the system is not used.

In addition, a member for limiting the movement of the disc which has the above mentioned function may be provided independently of the disc stopper 71, and in such a case, various configurations can be employed for such a member.

Figure 8A:
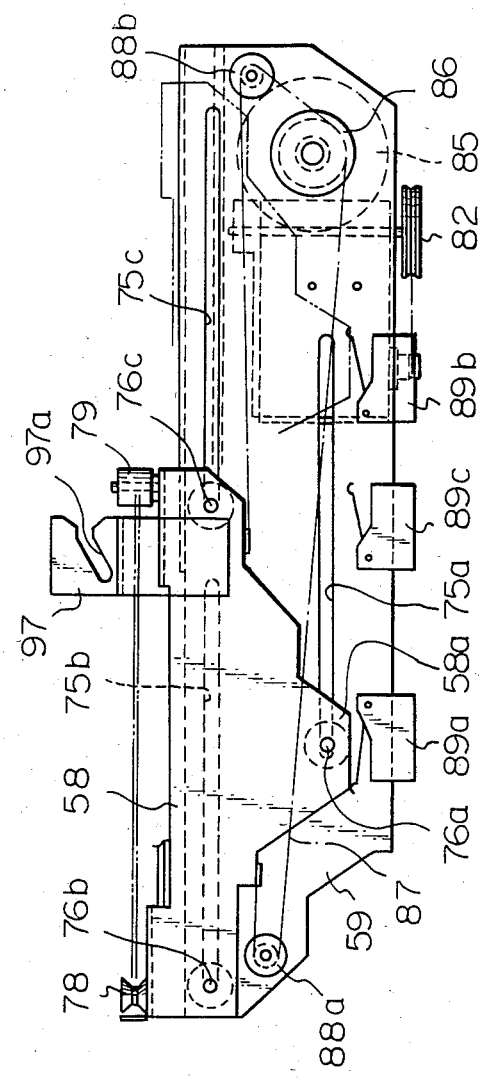
FIG. 8a is a plan view of a disc slider portion.

Referring to FIG. 8, the slider portion is now explained.

As shown, three elongated slots 75a to 75c are formed on the upper face of the guide base 59. The slider 58 is linearly movable against the guide base via guide pins 76a to 76c which are engaged with the slots 75a to 75c respectively.

Generally drum shaped taking out roller 78 and reset roller 79 are connected to the slider 58 via a pair of arms 77a and 77b, respectively, so as to be spaced by a predetermined distance along the axis of the movement of the slider 58. The rollers 78 and 79 are formed to put the outer periphery of the disc therein, and adapted as a transporting means of the disc which transports the disc from the disc holder portion 32 to the play position, or from the play position to the disc holder portion 322 so that the disc rolls to move.

A drive motor 80 for driving the slider 58, and a worm gear 83 connected thereto via a belt 81 and a pulley 82 are attached to the guide base via a bracket 84.

A pinion gear 85 is meshed with the worm gear 83 and a drive pulley 86 is commonly mounted on the shaft of the pinion gear 85.

A wire 87 is coiled on the pulley 86 and guided by a pair of pulleys 88a and 88b, respectively, provided at each end of the guide base 59 so that the slider 58 is driven by the drive force of the motor 80.

A pair of sensing switches 89a and 89b are provided for sensing the position of the slider 58 at each end of the movable range thereof by an engagement with a cam portion formed on the slider 58.

A sensing switch 89c is further provided for determining the side of the disc and whether the disc is set or not.

Figure 9A:
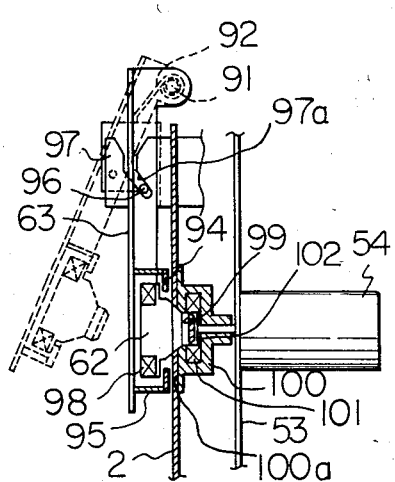
FIG. 9a is a partially sectional plan view of a disc clamper.
Figure 9B:
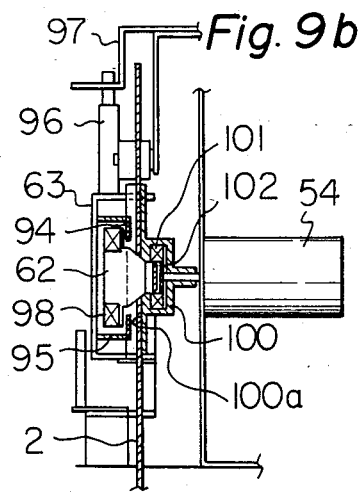
FIG. 9b is a partially sectional front view of the disc clamper.
Figure 9C:
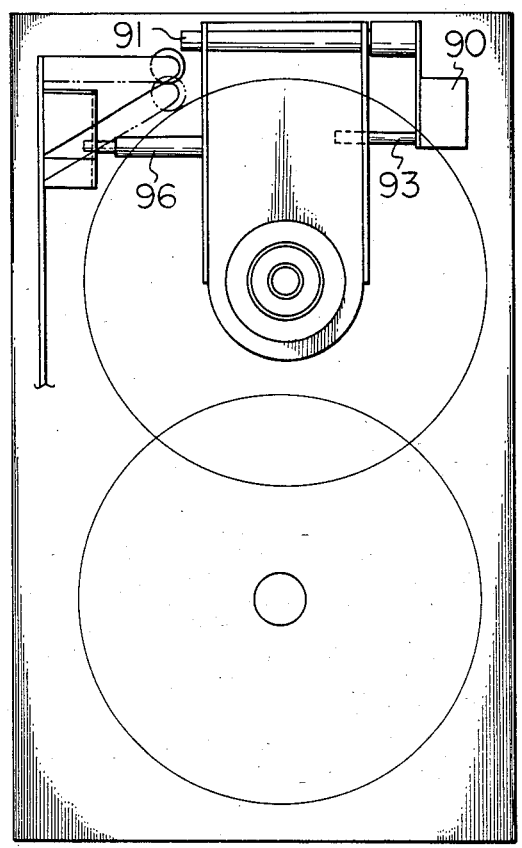
FIG. 9c is a side view of the disc clamper.

Reference is now made to FIG. 9 in which the construction of the clamper is illustrated.

As shown, a reception base 90 is provided on the carrier 40 and a clamp arm 63 is rotatably disposed on a shaft 91 and biased by a spring 92 in the clockwise direction in the figure, i.e., the direction of opening.

The range of rotation of the clamp arm 63 is defined by a pin 93 which projects form the reception base 90.

The clamp arm 63 is provided with a guide portion 95 having a magnetic material 94 at the end thereof, and a guide pin 96 for effecting the rotation of the clamp arm in the counter clockwise direction, i.e., the direction of closing.

When the disc is loaded on the position of play, the guide pin 96 engages with a guide groove formed on an engagement member 97 provided on the slider 58, so as to drive the clamp arm 63 in the direction of closing against the resilient force of the spring 92.

A clamper 62 in the form of truncated cone is loosely received in the guide portion 95.

The clamper 62 is provided with an annular magnet 98 at the base portion thereof, and a magnetic material 99 at the head portion thereof.

The clamper 62 and the clamp arm 63 are made of a non magnetic material.

A drive motor 54 of the disc 2 is disposed on the portion of the mechanism base 53 which faces the clamper 62.

A turntable 100, in which a ring form magnet 101 and a yoke 102 are incorporated, is connected to the shaft of the motor so that the disc is driven by the motor 54 directly.

When the disc is loaded on the play position, the clamp arm 63 is then swingably moved in the direction of closing by the engagement between the guide pin 96 of the clamp arm 63 and the guide groove 97a of the engage member 97 provided on the slider 58.

With the rotation of the clamp arm 63, the head portion of the clamper 62 is inserted through the center hole of of the disc and into the turntable 100.

In this inserted state of the clamper 62, the magnetic material 99 on the head portion of the clamper 63, along with the magnet 101 and the yoke 102 in the turntable, forms a magnetic circuit, and is attracted to the yoke 102.

At the same time, the disc 2 held on the guide support 43 of the carrier 40 (see FIG. 3c) is raised by the tapered portion of the clamper 62 and finally clamped between the holding surface 100a of the turntable 100 and the clamper 62.

By the further rotation of the clamp arm 63, the guide portion 95, which has been engaged with the clamper 62 by the attraction force between the magnetic material 99 and the magnet 98, is disconnected from the clamper 62.

As the result, the clamper 62, the disc 2, and the turntable 100 are completely isolated form other members to permit a stable rotation of the disc 2.

Furthermore, the force of clamping the disc 2 is reinforced by an attractive force between the magnet 98 positioned at the bottom of the clamper 62 and the magnetic material 94 in addition to the initial clamping force between the magnetic material 99 and the yoke 102.

Figure 10:
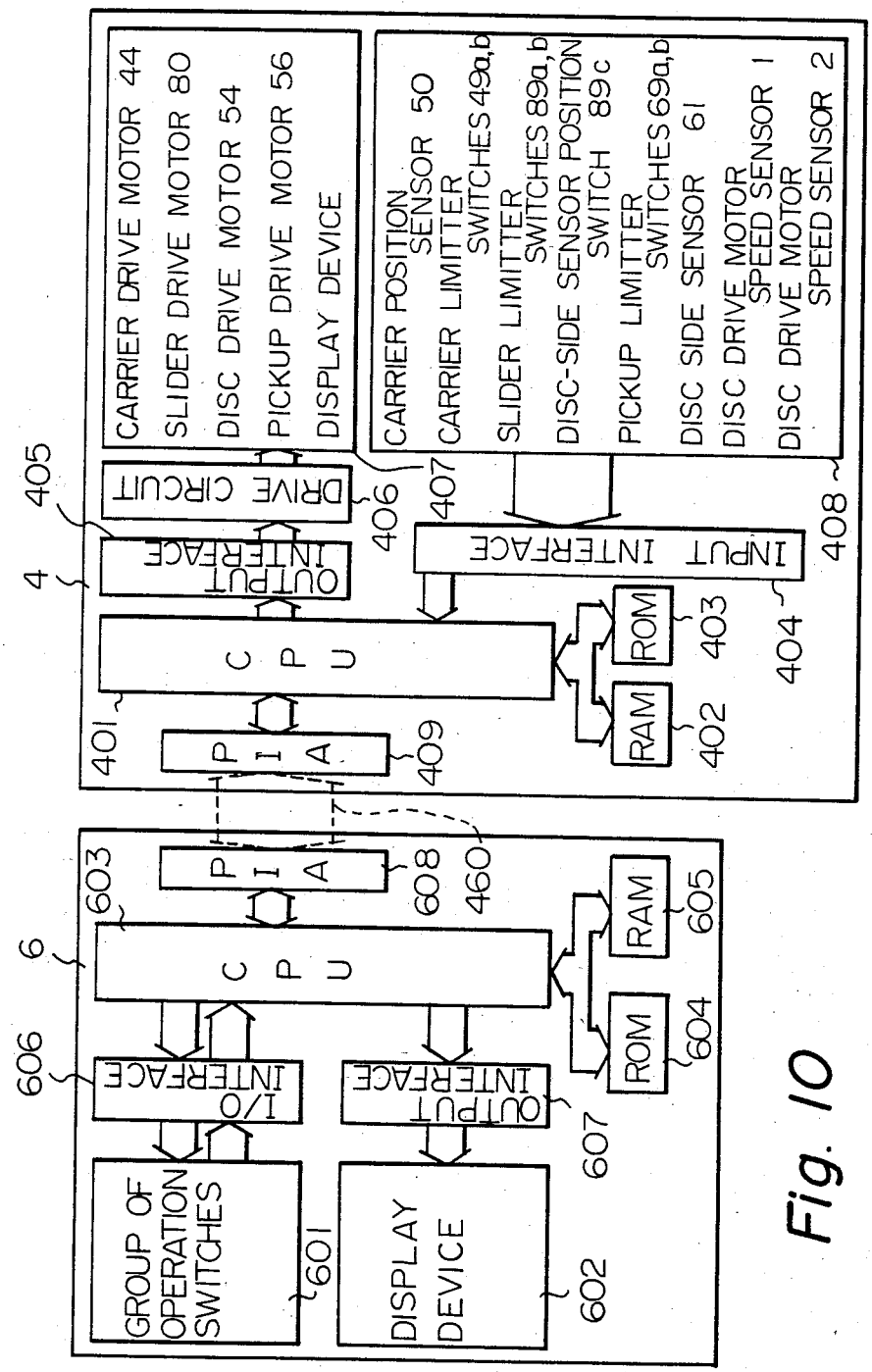
FIG. 10 is a block diagram of a control system.

Referring to FIG. 10, the control system of this automatic disc player system is explained.

As previously explained with reference to FIG. 2, the operation part 6 is provided with a group of switches 601 for designating the number the disc and the number of music to be played, and a display device 602 for displaying the number of the disc or the state of the operation of the system.

A control circuit comprising a CPU 603, a ROM 604 for storing an operation program, and a RAM 605 for storing the result of the operation, is connected to the switch group 601 and the display device 602 via pair of input/output interfaces 606 and 607, respectively.

The group 601 of the switches for operation is constructed to form a key matrix, and the entrance of the signal from the operated key is performed via a small number of junctions utilizing a key scanning operation.

In other words, the actuated key of the operation switch group 601 is sensed by the key scanning operation and the contents thereof is displayed on the display device 602 and in turn stored in the RAM 605 at the same time.

In the same manner as the operation part 6, the body 4 of the system is provided with a control circuit comprising a CPU 401, a RAM 402, and a ROM 403, an input interface 404, an output interface 405, a drive circuit 406, a set of actuators 407 and a source of input signals.

The actuator portion 407 includes a drive motor 44 for driving the carrier to a designated position, a slider drive motor 80 for loading the disc from the stored position to the playing position, a disc drive motor 54 for driving the disc, a pickup drive motor 56 for driving the pickup for the reproduction of the recorded information along a radial axis of the disc, and various elements of display.

The input signal source 408 includes the carrier position sensor 50 formed by an optical means for sensing the position of the carrier, the carrier limit switches 49a and 49b for limiting the movable range of the carrier, the slider limit switches 89a and 89b for detecting that the disc is positioned at the stored position, or the playing position a disc side sensor 61 for sensing the side of the disc or the absence of the disc during the loading operation, a disc side sensor position swtich 89c for sensing the position of the disc side sensor 61, pickup limit switches 69a and 69b for sensing that the pickup is positioned at the inner or the outer limit of the recorded track of the disc, a disc motor speed sensor 1 for sensing that the speed of the disc drive motor 54 is at a predetermined level, a second disc motor speed sensor 2 for sensing that the disc drive motor 54 is stopped, and an information discrimination part for discriminating, from a control signal produced demodulating the output signal of the disc, various information, such as the determination of the inner or the outer limit of the recording track of the disc, or the number of the music recorded on the disc.

The drive circuit 406 receives a two bit binary signal for controlling the start and stop of each motor in the normal or reverse direction of rotation. In this case, the signal (0,0) indicates the stopped condition and the signal (0,1) indicates rotation in the normal direction, and the signal (1,0) indicates the rotation in reverse direction, for example.

If necessary, three bit signals may be used in place of the signals described above for indicating the speed of rotation. In such a case, the signal (0,0,0) indicates the stopped condition, signal (0,0,1) indicates the low speed rotation in the normal direction, the signal (0,1,0) indicates low speed rotation in the reverse direction, the signal (1,0,1) indicates high speed rotation in the normal direction, and the signal (1,1,0) indicates high speed rotation in the reverse direction.

Furthermore, signals having more than three bits may be used with speed control means including a D/A converter.

The body 4 of the system is connected to the operation part 6 by means of a bidirectional data transmission system 460.

Via peripheral interface adapters (PIA)401 and 608, the CPUs 401, 603 of each part effect a handshake mode data transmission to transmit predetermined coded parallel data with a timing signal.

When the power current is supplied to the body 4, all of the mechanisms of the system are driven to their initial states (for example, the stop of the disc drive motor, release of the slider, positioning the carrier at its home position, and so on), and after the completion of this return operation, the operation part 6 is requested by the body 4 to transmit the data of the number of the first disc through the bidirectional data transmission system 460.

When the selection of the order of play is completed, the operation part 6 transmits the data of the number of the first disc via the bidirectional data transmission system 460 in response to the operation of the START key (see FIG. 2).

Then, in the body 4, the carrier 40 is driven to the position of the selected disc number of disc.

The control of the carrier stop position takes place, for example, by comparing the counted value of the output signal of the position sensor provided on the carrier with a reference count number corresponding to the position of the stored disc.

During this state, the body 4 and the operation part 6 display the signal showing that the system is under "ACCESS" operation (data for displaying this signal are transmitted from the body 4 to the operation part 6 through the bidirectional data transmission system).

When the carrier 40 is stopped at the position of the selected disc, the slider motor 80 is then driven to load the selected disc in the position of play.

In this loading operation, the disc side sensory position switch 89c disposed at the middle position of the loading mechanism is actuated by the movement of the slider 58, and the output signal of the disc side sensor 61 is received in the control circuit.

If the side of the disc is correct, the loading operation is continued.

On the other hand, if it is sensed that the disc is set inside out, or that there is no disk, the loading mechanism is returned to its initial state to stop the loading operation and a signal for indicating the error is displayed in the display device.

When the disc loaded in the play position is properly clamped by the clamper 62, the disc drive motor 54 then starts to rotate.

Subsequently, when the speed of the motor reaches a predetermined speed, the body 4 requires the operation part 6 to transmit the selected number of the music.

The selected number of the music is then compared with the number of the music in the disc information, and the pickup is immediately moved to the position of the recording track on the disc of the selected music program.

If the selected number is greater than the number of music contained in the disc, the pickup limiter switch 69b on the outer side of the recording track is actuated to determine that the selected number of the music can not be found.

In this condition, the pickup is not moved outward of the disc, and is returned immediately to the inner side of the disc, and at the same time, the error sign is displayed.

When the pickup is moved to the position of the selected music program, the pickup is ready to play and subsequently the system starts its playback operation.

In this state, the display device displays a sign of play.

When the play of the selected number of music is finished (when the number next to that of the played music is detected in the disc information), the body 4 requires the number of music to be played next, and the display of the sign of play is terminated at the same time.

Subsequently, the next music program is played in the same manner as described hereinabove.

When the selected music program is not contained in the disc loaded at that time, the slider 58 is operated to move to the position of the disc to be played next, after following the process of operation inversely, and the newly selected disc is loaded in the play position.

Figure 11:
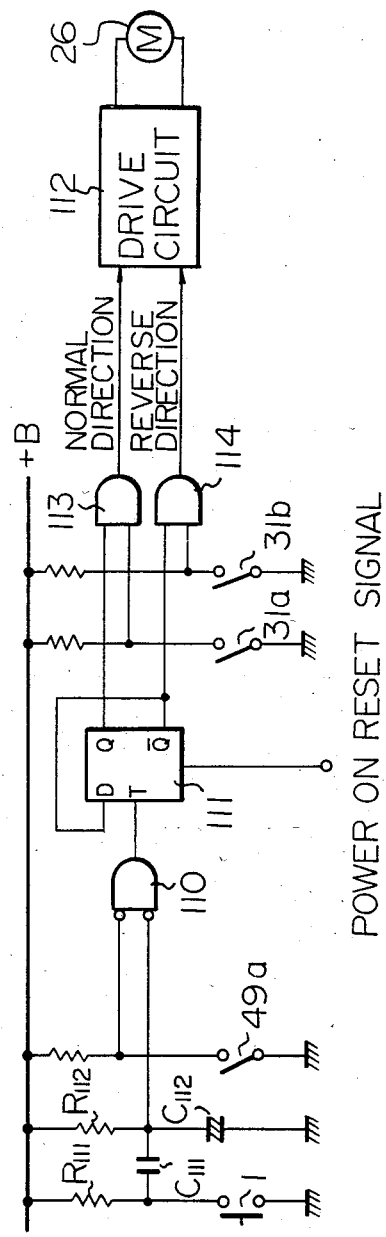
FIG. 11 is a circuit diagram of a control circuit of a door of disc entrance port.

Referring to FIG. 11, the operation of the control part of the door 5 is explained next.

As shown, the control circuit includes a differentiation circuit comprising resistors $R_{111}$ and $R_{112}$, and capacitors $C_{111}$ and $C_{112}$ which produces a pulse signal upon closure of the door switch 1 disposed on the front face of the body, and a carrier limit switch 49a which senses that the carrier is positioned at the home position thereof.

The output signals of the differentiation circuit and the carrier limit switch 49a are respectively supplied into two inputs of a logic gate 110.

The output signal of the logic gate 110 is fed to a clock input of a T flip-flop 111.

A pair of output signals Q and $\overline{Q}$ of the T flip-flop 111 are received by a door opening limit switch 31a and a door closure limit switch 31b respectively and also received by a pair of logic gates 113 and 114, respectively.

The output signals of the logic gates 113 and 114 are supplied to a drive circuit 112 as control signals for normal and reverse rotation of the drive motor 26.

A reset terminal of the T flip-flop 11 is supplied with a power supply reset signal.

When the power current is supplied to the system, the power supply reset signal is applied to the T flip-flop 111 to set the Q terinal at a low level, and the $\overline{Q}$ terminal at a high level. (Q=L, $\overline{Q}$=H)

Therefore, the drive motor 26 is rotated in the reverse direction to close the door 5 until the door closure limit switch 31b produces a low level signal which indicates the closure of the door 5.

On the other hand, the output signal of the door switch 1 is effective to turn over the state of the T flip-flop 111 only when the carrier limit switch 49a produces a low level output signal which indicates that the carrier 40 is placed at the home position.

When the door switch 1 is operated under this condition, the level of the signals at the terminals Q and $\overline{Q}$ of the T flip-flop are changed to cause the rotation of the drive motor 26. Thus the door 5 is moved from the initial position until the door opening limit switch 31a or the door closure limitter switch 31b produces the low level signal.

In accordance with the operation of the control part described above, since the door 5 can be opened only when the carrier 40 is returned to the home position, a malfunction of the system caused by touching the disc or the carrier 40 while playing, which may otherwise occur, is prevented.

The operation of the automatic disc player system according to the present invention is explained hereinafter.

The operation for putting the disc in the system is explained first.

When the door switch 1 on the front face of the body 4 is pushed, the door 5 will automatically move to open the disc holder portion 32 to the user of the system.

In order to set the disc in the disc holder portion 32, it is sufficient to insert the disc into one of the slots formed between the partition plates 35.

Upon this insert operation, the rear end portion of the disc is supported by the disc stopper 71 to prevent the same from protruding into the portion behind the disc holder portion 32 since the disc stopper is moved to a predetermined position by the engagement between the cam pin 74 and the cam member 73 of the carrier 40.

After this setting operation, it is preferably to enter the title of the disc and the title of the music contained therein, respectively, into an index part 13a and a MEMO part of the corresponding index plate 13 for facilitating the searching of the title.

After completion of the setting of the disc, the door 5 is automatically closed by the operation of the door switch 1.

The operation for selecting the music program is explained hereunder.

The selection operation is divided into two types.

In the first type of operation, the number of the selected disc and the number of the selected music program are, in that order, keyed into the number keys 7 of the operation part 6.

Figure 12A:
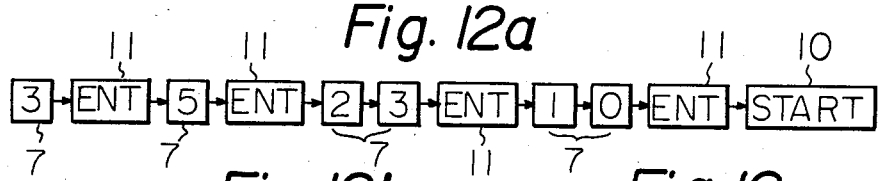
FIGS. 12a to 12d are figures showing the operation of selecting and determining the order of play.

By way of example, if the fifth music program of the third disc and the tenth music program of the twenty third disc are to be registered, the keys are operated in accordance with the order shown in FIG. 12a. (the explanation thereof is omitted.)

In the second type of operation, the plurality of index plates 13 are turned to find the desired music program initially, then the number of the disc is keyed via the index key 15. (in this case, the designation of the number of music is also made by means of the number keys 7.)

Figure 12B:
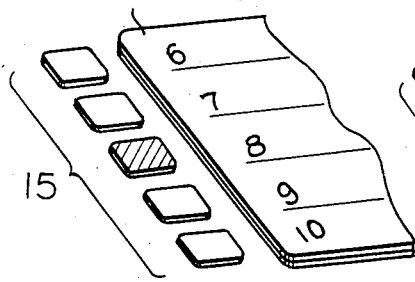
Figure 12C:
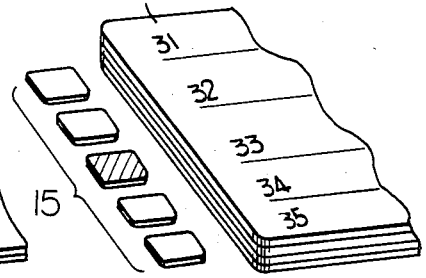

If the third music program of the eighth disc and a fifth music program of the thirty-third disc are to be registered in accordance with the second type of operation, the index plates 13 are turned over to open the page in which the desired music program is entered in the initial state. (see FIGS. 12b and 12c.)

Then one of the index keys 15 corresponding to the index number is pushed and subsequently the number of the music program is keyed through the number keys 7.

Figure 12D:
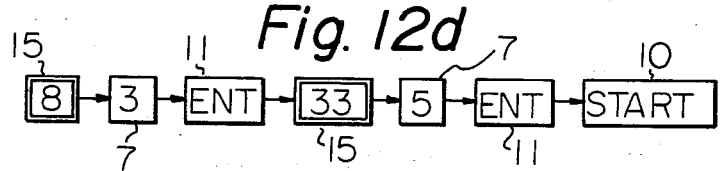

The subsequent operation is shown in FIG. 12d. (FIG. 12d includes the operations described above in the first two steps illustrated therein.)

In addition, a set of index switches 14 are disposed to cooperate with an extension or a recess on the side of the index plate 13 so as to change the connection of the index keys 15 automatically when the index plate 13 is turned over.

When the START key 10 is operated after the registration of the selected music programs in accordance with either one of the above mentioned first and second types of operation, each mechanism of the system starts its operation and the ACCESS indicator 20 is lighted up at the same time.

Figure 13:
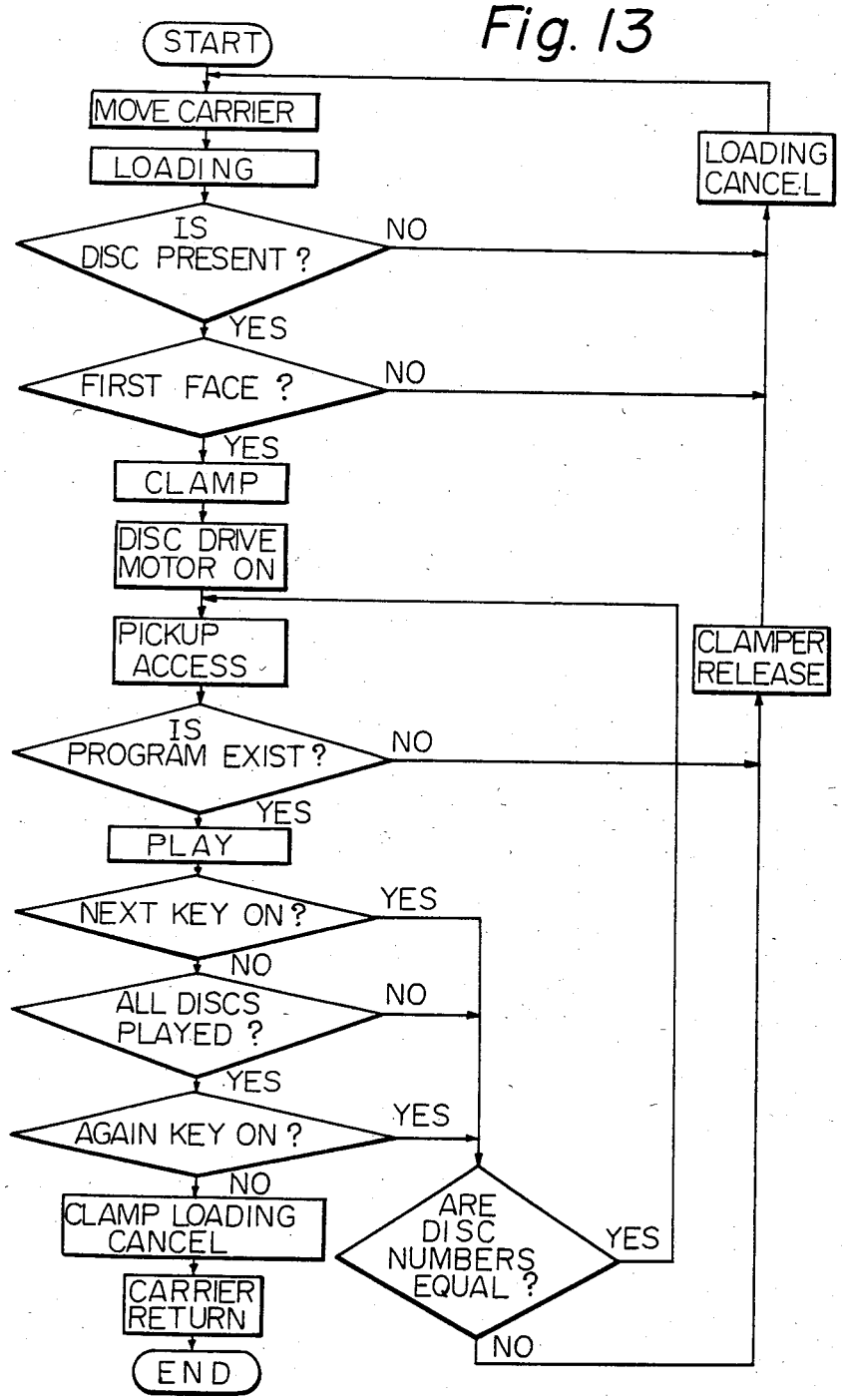
FIG. 13 is a flow chart for showing the operation of each mechanism of the system.

The operation of each mechanism is explained with reference to the flow chart of FIG. 13 hereunder.

When the start command is inputted by the START key 10, the carrier assembly 64 moves to the position of the selected disc.

In this state, the cam pin 74 on the stopper arm 72 is disengaged with the cam member 73 that projects from the carrier 40 with the movement of the carrier assembly 64.

Consequently, the disc stopper 71 automatically rotates about its axis of rotation in the counter clockwise direction to its turnout position, so as to allow the transportation of disc to the position of play.

During the movement of the carrier assembly 64, the DISC indicator 16 indicates the number increasing from zero, and finally to the number corresponding to the selected disc.

Also during this state, the ACCESS indicator 20 turns off.

When the carrier assembly 64 stops at the predetermined position, the slider 58 which loads the disc in the play position starts to move.

With the movement of the slider 58, the STAND BY indicator 19 is lighted up. The STAND BY indicator 19 is turned on during the loading of the disc on the turntable 100 and turned off when the play of music is started.

The operation of the mechanism of the slider portion is explained with reference to FIG. 14.

Figure 14A:
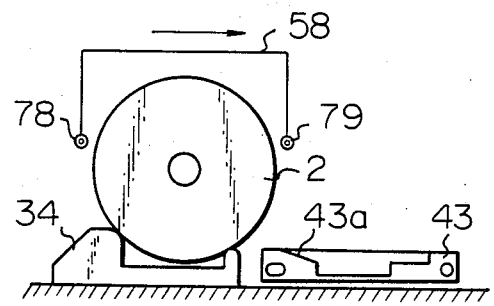
FIGS. 14a to 14c are figures showing the operation of the disc slider portion.
Figure 14B:
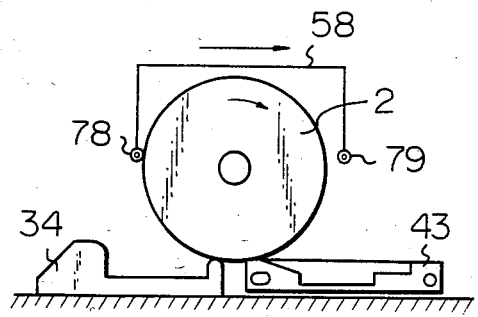
Figure 14C:
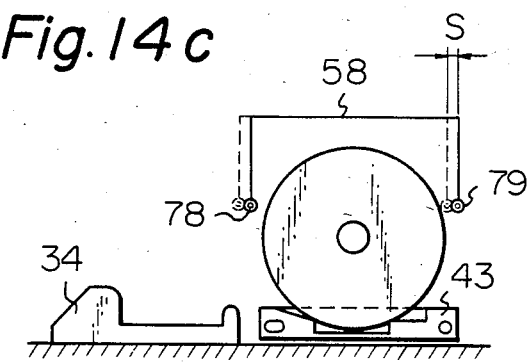

When the carrier 40 is stopped at the position of the selected disc, the taking out roller 78 and the reset roller 79 are positioned as shown in FIG. 14a.

Then the slider drive motor 58 starts to move the slider in the backward direction (shown by the arrow in the figure).

With this movement of the slider 58, the taking out roller 78 comes into contact with the periphery of the disc 2 and pushes it toward the play position in which the disc is received by the clamper 62, in other words, on the guide support 43 having the slope 43a, provided on the carrier 40. (see FIG. 14b.)

After setting the disc in position, the slider 58 still moves rearward, so as to form a gap S between the periphery of the disc 2 and reset roller 79. (see FIG. 14c.)

In this state, the clamping of the disc (described hereafter) takes place.

During the loading operation, the slider 58 actuates the disc side sensor position switch 89c by means of the cam portion 58a thereof.

In response to the actuation of the switch 89c, the disc side sensor 61 is operated to determine whether or not the disc is present and to determine the side of the disc. In case the disc is not present or if the disc is set inside out, the slider 58 changes the direction of movement so as to return the disc to the disc holder portion 32.

The ERROR indicator 21 is lighted up at the same time.

If the disc is set properly, the laoding operation is continued to place the disc in the play position.

Figure 16:
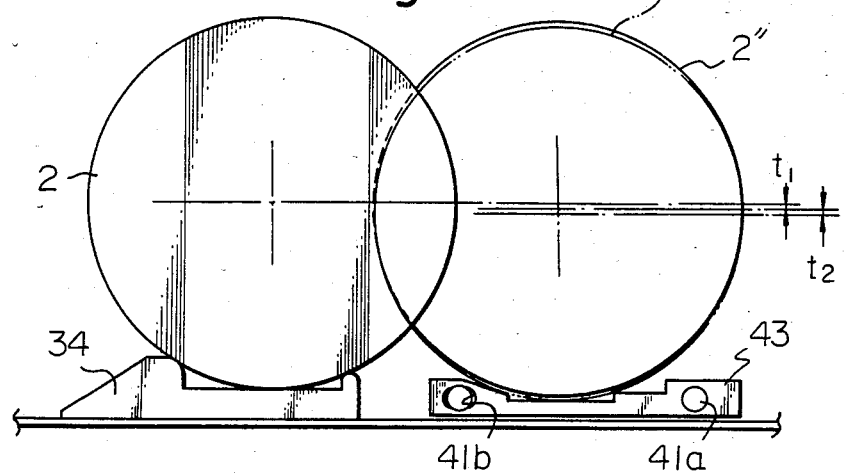
FIG. 16 is a side view of the disc, showing the relationship of the positions respectively for storing and playing.

The disc 2 is, in the play position, supported by the guide support 43 in a manner that the center of the disc is positioned slightly lower than the position of the center when the disc is held in the disc holder portion 32. (see FIG. 16.)

In this state, the guide groove 97a of the engage member 97 provided on the slider 58 engages with the guide pin 96 fixed to the clamp arm 68 to rotate the clamp arm 68 in the direction of closing thereof.

With the rotation of the clamp arm 68, the head portion of the clamper 62 passes through the center hole of the disc to be received by the turntable 100.

In this state, the magnetic material 99 in the head portion of the clamper 62 is attracted by the yoke 102 in the turntable 100, causing the tapered portion 62a of the clamper 62 to raise the disc from the guide support 43 and to clamp the same disc between the turntable 100 and the champer 62.

In this state, the disc 2 is raised by the amount $t_2$ ($t_1 22 t_2$) from the postion on the guide support 43. (see FIG. 16.)

When the loading of the disc on the turntable 100 is completed, the slider limit switch 89b is turned on to produce a clamping finish detecting signal. (The switch 89a detects that the slider 58 is in the home position.)

In response to the output signal of the switch 89b, the disc drive motor 54 begins to rotate.

When the speed of the disc drive motor reaches a predetermined level, the pickup 55 immediately moves to the leading position of the selected music on the recorded track of the disc 2.

During this state, the ACCESS indicator 20 is turned on and the PROGRAM indicator 7 indicates the number of the music program when the pickup is stopped at the position of the selected music program.

The pickup 55 is then switched to its constant speed movement to play back the music recorded on the disc.

During playback operation, the STAND BY indicator 19 and ACCESS indicator 20 are turned off and the PLAY indicator 18 alone is turned on.

Figure 17:
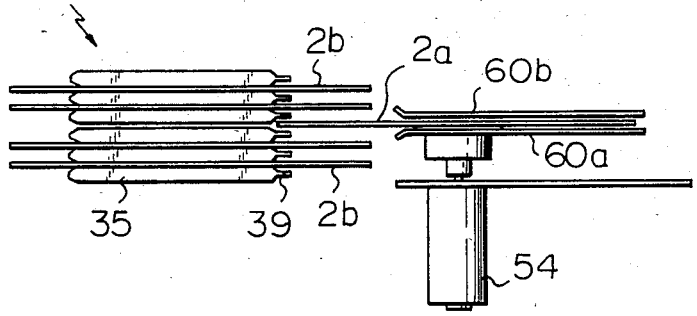
FIG. 17 is a figure showing the relationship of the positions of the partition plate, a guide plate, and disc during the playing operation of play.

As shown in FIG. 17, during this playback operation, the disc 2 is positioned in a manner that the peripheral portion of the disc being played is received in a space formed between the peripheral portions of the discs held in the disc holder portion 32.

Furthermore, the peripheral portion of the disc is received in a gap formed between the flange portions of the two adjacent partition plates 35.

By this feature, the stroke of the movement of the disc is shortened and therefore the depth of the body 4 of the system is reduced considerably.

In addition, disposition of the peripheral portion of the disc 2 between the flanges of the partition plates 3 has an effect to eliminate the error in returning the disc in the holding position.

Figure 18A:
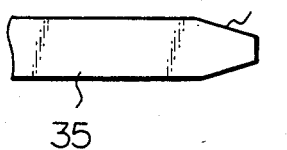
FIGS. 18a and 18b are plan views of another example of the forms of an end of the partition plate on the side adjacent to the disc when in playing position.
Figure 18B:

Further, the edge of the partition plate 35 located on the side of the playback position may be formed into a tapered portion 35a shown in FIG. 18a or a simple plate shown in FIG. 18b.

When the edge of the partition plate 35 is tapered, the peripheral portion of the disc can also be positioned between the tapered portions 35a.

When the play of the all of the selected music is finished, the pickup is returned to the home position and the PLAY indicator 18 is turned off.

Thereafter, the disc 2 is released from the clamper 62, and returned to the disc holder portion 32.

Then the carrier is returned to the home position.

Thus, the series of operations is completed.

Hereafter, the operation of the system under special conditions is explained.

When the search of the selected music takes place during the movement of the pickup, if the selected number is greater than the number of music programs recorded on the disc, in other words, if the selected music is not found out, the pickup is returned to its home position by the operation of the pickup limit switch 69b of the outer side.

After that, the discs is released from the clamper and returned to the disc holer portion and the same operations described above is repeated thereafter.

If the NEXT key is operated, during the playback operation, to command the skip operation to the next one of the registered discs or music programs, the disc is changed to the next one of the selected discs in the manner described, or the pickup is moved to the position of leading part of the next one of the selected music programs in the case of the latter.

If the AGAIN key 12 is operated to command the repetition of the play, the pickup is moved to the position of the leading part of the music program being played.

In addition, the system according to the present invention may readily be adapted for the use of discs of various types and sizes, and especially, the size of the system is considerably reduced, as compared with conventional systems, by using the so called "compact disc" as the preferred embodiment.

It will be appreciated from the foregoing, the automatic disc player system according to the present invention has various advantages such that the size of the system is reduced by the feature that the disc playing means is disposed adjacent to the disc holder portion and movable along the direction of the arrangement of the discs, and that the stroke of the slide of the disc is shortened.

Furthermore, the discs are set to the system very easily since the disc holder portion is positioned adjacent to the disc entrance port, and the body of the system is capable of being stacked with other equipment since the disc entrance port is formed on the front face of the system.

The system has further advantages that an additional box or case for storing the discs is not necessary because the discs are stored in the body of the system and that the operation of the system is very simple since the loading of the discs is automatically accomplished by the control of the external control means.

In addition, the system according to the present invention is suited for family use as well as business use which is the case of the prior art.

While a preferred embodiment has been described, variations thereto will occur to those skilled in the art within the scope of the present inventive concepts.

By way of example, the disc playing means including the pickup 55 may be disposed above the disk holder portion 32.

What is claimed is:

1. An automatic disc player system comprising:
    a cabinet means having an entrance port with a door;
    a holder means disposed within said cabinet means and adapted to removably receive a plurality of discs in upright position along a horizontal axis so that said discs are juxtaposed with each other;
    a disc playing means;
    a carrier means on which said disc playing means is mounted and linearly movable in a direction parallel to said horizontal axis within a range of movement including a home position at which said carrier means is at rest;
    a disc transportation means mounted on said carrier means for transporting a selected one of said discs between said holder means and said disc playing means; and
    a control means for controlling the opening and closing of said door, including
    (a) a manually operable door control switch for generating a door operation command signal;
    (b) a carrier position detection switch associated with said carrier means, for generating a carrier position detection signal when said carrier means is resting in the home position;
    (c) a driving means connected to said door for opening and closing said door in response to said door operation command signal; and
    (d) a transmission means connected between said door control switch and said driving means and responsive to said carrier position detection signal for transmitting said door operation command signal only when said carrier position detection signal is present.

2. An automatic disc player system comprising:
    a holder means adapted to removably receive a plurality of discs in upright position along a horizontal axis so that said discs are juxtaposed with each other;
    a disc playing means linearly movable in a direction parallel to said axis; and
    a disc transportation means for transporting a selected one of said discs between said holder means and said disc playing means, wherein said holder means is provided with a disc stop means actuated by said disc transportation means and movable between a first position for allowing said plurality of discs to move to said disc playing means and a second position for preventing said plurality of discs from moving out of said holder means.

3. An automatic disc player system as set forth in claim 2, wherein said disc stop means is an elongated member disposed substantially parallel to said axis and supported by a pair of lever arms rotatable around a pivot axis parallel to said axis, for allowing rotation of said elongated member around said pivot axis between said first and second positions.

4. An automatic disc player system comprising:
    a holder means adapted to removably receive a plurality of disc in upright position along a horizontal axis so that said discs are juxtaposed with each other;
    a disc playing means linearly displaceable in a direction parallel to said axis; and
    a disc transportation means for transporting a selected one of said discs between said holder means and said disc playing means, wherein said holder means includes an elongated block-like support member having a longitudinal recess in an upper surface thereof, said recess defining a pair of spaced upper longitudinal peripheral edges of said elongated support member, and a plurality of dividers mounted on said support member, said support member being formed such that one of the upper longitudinal peripheral edges of said recess closer to the side of said disc playing means is lower than the other peripheral edge.

5. An automatic disc player system as set forth in claim 4, wherein each of said dividers has a cross section of generally I-shaped form, and upper and lower projected edges thereof contactable to the surface of the disc are coated with a material for reducing friction with the surface of the disc, and both ends of the upper and lower projected edges are provided with a tapered portion by which the width of the projected edge is gradually reduced for ensuring an easy entrance and exit of the disc into a space between the dividers.

6. An automatic disc player system comprising:
    a cabinet means having an entrance port with a door;
    a holder means disposed within said cabinet means and adapted to removably receive a plurality of discs in upright position along a horizontal axis so that said discs are juxtaposed with each other;
    a disc playing means linearly movable in a direction parallel to said axis;
    a disc transportation means for transporting a selected one of said discs between said holder means and said disc playing means; and
    means for controlling opening and closing of said door in accordance with the operational state of at least one of said disc playing means and said disc transportation means, including: a manually operable door control switch for generating a door control command signal; a carriage position detection switch associated with a movable carriage on which said disc playing means is mounted for generating a carriage position detection signal when said carriage is resting in a home position; a closing detection switch associated with said door, for generating a closing detection signal when said door is closed, and an opening detection switch associated with said door, for generating an opening detection signal when said door is opened; a transmission means responsive to said door open command signal and said carriage position detection signal for transmitting said door control command signal only when said carriage position detection signal is present, said transmission means including an input gate responsive to said door control command signal and said carriage position detection signal for producing said door control command signal upon the presence of said carriage position detection signal, a flip-flop circuit responsive to the output signal of said input gate, for alternately producing a first signal for operating said driving means in a direction for opening said door, and a second signal for operating said driving means in another direction for closing said door, a first output gate responsive to said first signal from the flip-flop and said opening detection signal, for providing said first signal to the driving means unless said opening detection signal is received, and a second output gate responsive to said second signal from the flip-flop and said closing detection signal, for providing said second signal to the driving means unless said closing detection signal is received; and a driving means connected to said door for opening and closing said door in response to said door control command signal transmitted from said transmission means.

7. An automatic disc player system comprising:
a holder means adapted to removably receive a plurality of discs in upright position along a horizontal axis so that said discs are juxtaposed with each other;
a disc playing means linearly movable in a direction parallel to said axis; and
a disc transportation means for transporting a selected one of said discs between said holder means and said disc playing means, wherein said holder means is provided with a disc stop means movable between a first position for allowing said disc to move to said disc playing means and a second position for preventing said plurality of discs from moving out of said holder means, said disc stop means including an elongated member disposed substantially parallel to said axis and supported by a pair of lever arms rotatable around a pivot axis parallel to said axis, for allowing rotation of said elongated member around said pivot axis between said first and second positions, and wherein one of said elongated member and said lever arms is provided with a latch projection for latching the elongated member in the second position, said latch projection being engageable with a latching member connected to said disc playing means when said disc playing means is resting in a home position.

* * * * *